United States Patent
Kumar et al.

(10) Patent No.: US 12,047,485 B2
(45) Date of Patent: Jul. 23, 2024

(54) TIME AND FREQUENCY DOMAIN SIDE-CHANNEL LEAKAGE SUPPRESSION USING INTEGRATED VOLTAGE REGULATOR CASCADED WITH RUNTIME CRYPTO ARITHMETIC TRANSFORMATIONS

(71) Applicant: Intel Corporation, Santa Clara, CA (US)

(72) Inventors: Raghavan Kumar, Hillsboro, OR (US); Xiaosen Liu, Portland, OR (US); Harish Krishnamurthy, Beaverton, OR (US); Sanu Mathew, Portland, OR (US); Vikram Suresh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/132,365

(22) Filed: Dec. 23, 2020

(65) Prior Publication Data
US 2022/0200784 A1 Jun. 23, 2022

(51) Int. Cl.
*H04L 9/00* (2022.01)
*G05F 1/46* (2006.01)
(Continued)

(52) U.S. Cl.
CPC ............... *H04L 9/003* (2013.01); *G06F 1/26* (2013.01); *H04L 9/0631* (2013.01); *H04L 2209/08* (2013.01)

(58) Field of Classification Search
CPC ... H04L 9/003; H04L 9/0631; H04L 2209/08; H04L 9/0869; H04L 2209/12; G06F 1/26; G05F 1/468; G05F 1/575; G05F 1/59
See application file for complete search history.

(56) References Cited

U.S. PATENT DOCUMENTS

| 10,154,552 B2 * | 12/2018 | Takacs | H05B 45/38 |
| 2007/0140478 A1 * | 6/2007 | Komano | H04L 9/0618 |
| | | | 380/28 |

(Continued)

OTHER PUBLICATIONS

Das et al., "Deep Learning Side-Channel Attack Resilient AES-256 using Current Domain Signature Attenuation in 65nm CMOS", 2020 IEEE Custom Integrated Circuits Conference (CICC), Mar. 22, 2020, 4 pages.

(Continued)

*Primary Examiner* — Darren B Schwartz
(74) *Attorney, Agent, or Firm* — NICHOLSON DE VOS WEBSTER & ELLIOTT LLP

(57) ABSTRACT

Apparatus and method for resisting side-channel attacks on cryptographic engines are described herein. An apparatus embodiment includes a cryptographic block coupled to a non-linear low-dropout voltage regulator (NL-LDO). The NL-LDO includes a scalable power train to provide a variable load current to the cryptographic block, randomization circuitry to generate randomized values for setting a plurality of parameters, and a controller to adjust the variable load current provided to the cryptographic block based on the parameters and the current voltage of the cryptographic block. The controller to cause a decrease in the variable load current when the current voltage is above a high voltage threshold, an increase in the variable load current when the current voltage is below a low voltage threshold; and a maximization of the variable load current when the current voltage is below an undervoltage threshold. The cryptographic block may be implemented with arithmetic transformations.

23 Claims, 15 Drawing Sheets

(51) Int. Cl.
*G05F 1/575* (2006.01)
*G05F 1/59* (2006.01)
*G06F 1/26* (2006.01)
*H04L 9/06* (2006.01)
*H04L 9/08* (2006.01)

(56) References Cited

U.S. PATENT DOCUMENTS

| | | | | |
|---|---|---|---|---|
| 2008/0056490 | A1* | 3/2008 | Akishita | H04L 9/002 380/44 |
| 2010/0257373 | A1* | 10/2010 | Motoyama | G06F 21/755 713/189 |
| 2013/0077790 | A1* | 3/2013 | Kawabata | H04L 9/0631 380/28 |
| 2013/0111224 | A1* | 5/2013 | Gunnam | H04L 9/003 713/300 |
| 2014/0293665 | A1* | 10/2014 | Hart | H02M 1/36 363/49 |
| 2018/0097618 | A1* | 4/2018 | Kumar | H03K 19/215 |
| 2018/0307865 | A1* | 10/2018 | Renaudin | G06F 21/755 |
| 2020/0382954 | A1* | 12/2020 | Chazot | H04L 9/14 |
| 2022/0068163 | A1* | 3/2022 | Omino | H04L 9/0631 |
| 2022/0082648 | A1* | 3/2022 | Tico | G01R 35/00 |

OTHER PUBLICATIONS

European Search Report and Search Opinion, EP App. No. 21198425.7, Mar. 17, 2022, 15 pages.

Kumar et al., "A 4900µm² 839Mbps Side-Channel Attack Resistant AES-128 in 14nm CMOS with Heterogeneous Sboxes, Linear Masked MixColumns and Dual-Rail Key Addition", 2019 Symposium On VLSI Circuits, Jun. 9, 2019, pp. C234-C235.

Kumar et al., "A SCA-Resistant AES Engine in 14nm CMOS with Time/Frequency-Domain Leakage Suppression using Non-linear Digital LDO Cascaded with Arithmetic Countermeasures", 2020 IEEE Symposium on VLSI Circuits, IEEE, Jun. 16, 2020, 2 pages.

Min et al., "A 1.3 V input fast-transient-response time digital low-dropout regulator with a VSSa generator for DVFS system", IEICE Electronics Express, vol. 14, No. 13, Jan. 1, 2017, pp. 1-11.

* cited by examiner

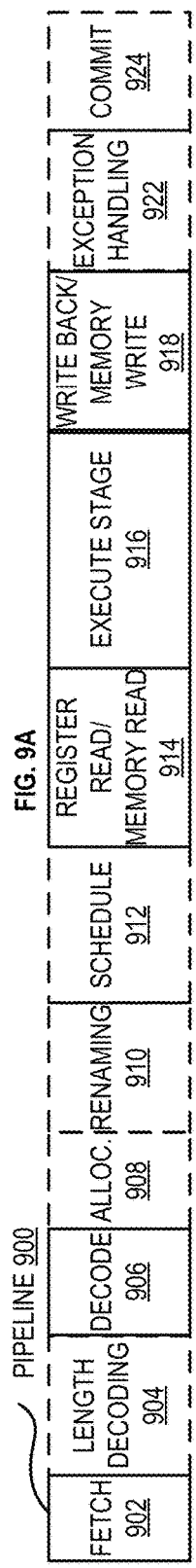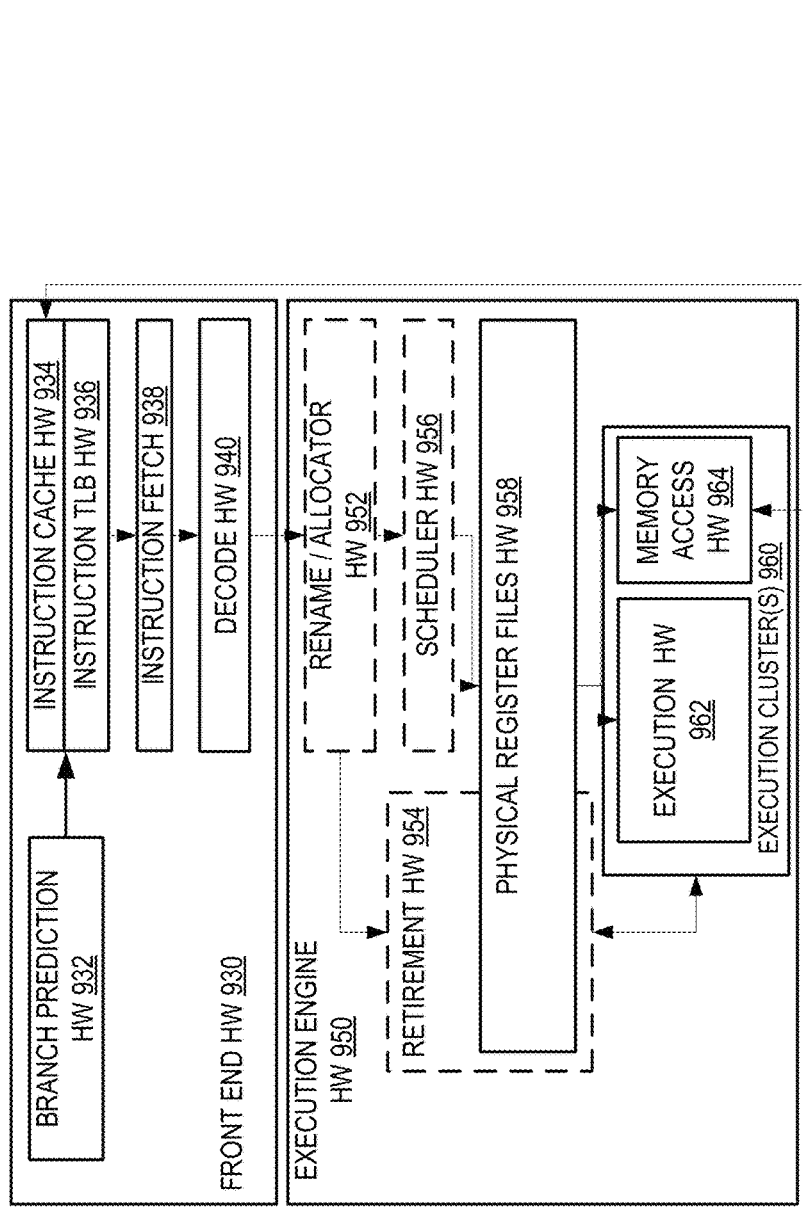

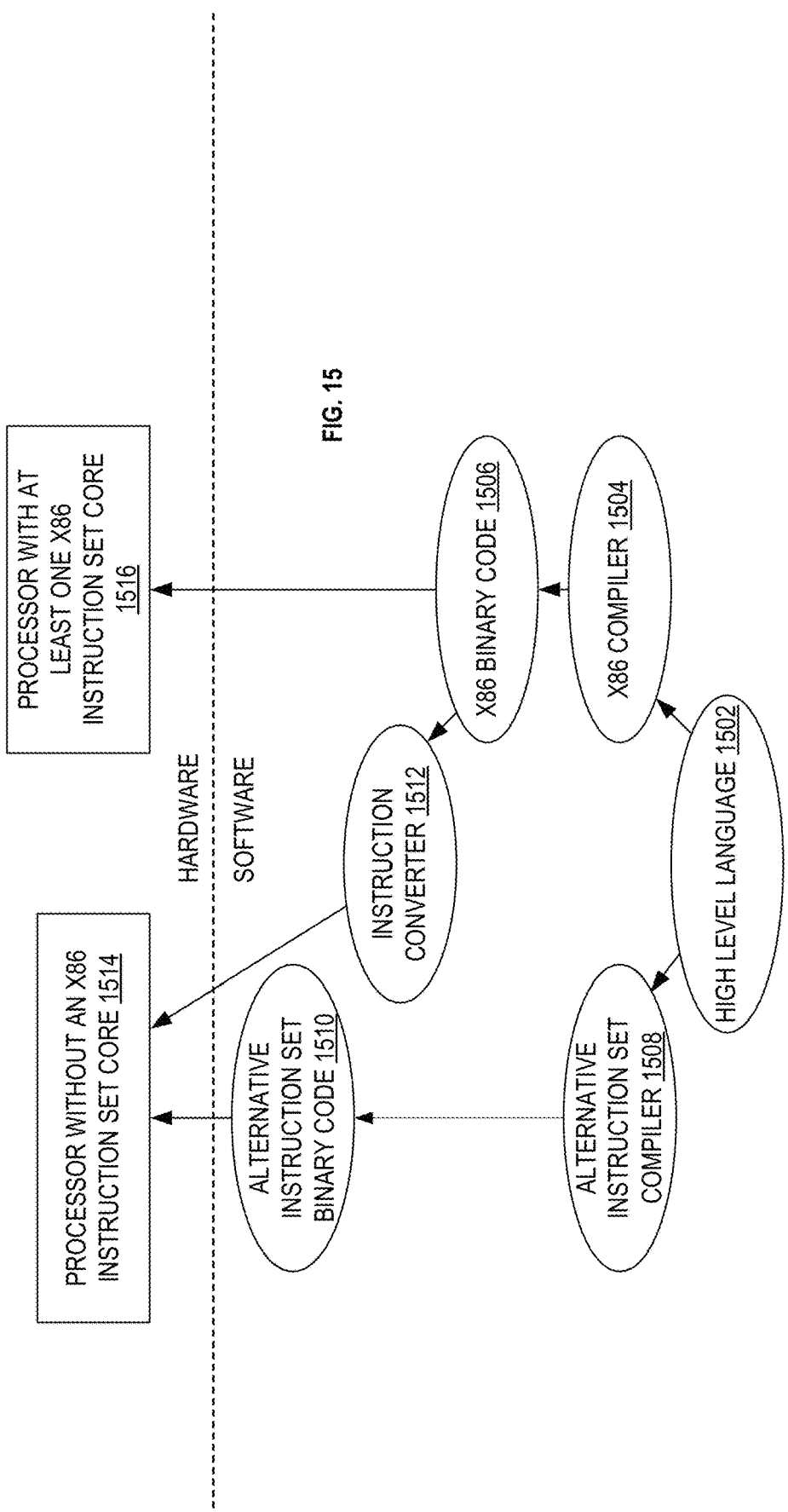

TIME AND FREQUENCY DOMAIN SIDE-CHANNEL LEAKAGE SUPPRESSION USING INTEGRATED VOLTAGE REGULATOR CASCADED WITH RUNTIME CRYPTO ARITHMETIC TRANSFORMATIONS

TECHNICAL FIELD

Embodiments of the invention described herein relate generally to information leakage suppression against side-channel attacks. In particular, the disclosure relates to a non-linear low-dropout regulator cascaded with a cryptographic block with arithmetic transformations.

BACKGROUND ART

Cryptographic engines such as AES (Advanced Encryption Standard), RSA (Rivest-Shamir-Adleman), and ECC (elliptic-curve cryptography) are susceptible to physical side-channel attacks (SCAs), which are attacks based on information gained from the implementation of the computing device rather than weaknesses in the implemented algorithm itself (e.g. cryptanalysis or software bugs). Physical characteristics such as timing information, power consumption, electromagnetic emissions, or even sound associated with the computing device can provide extra clues that can be exploited to extract information about the embedded secret. To counter side-channel attacks, numerous side-channel suppression techniques have been developed with the goal of significantly raising the minimum traces to disclose (MTD), or the minimum number of encryption traces required to disclose the first secret key byte. While conventional power regulator based SCA-resistant techniques can provide a considerable boost in the time-domain MTD, they tend to fall short in the frequency-domain MTD. This is because these techniques typically induce linear transformations which can be exposed relatively easily in the frequency spectrum through the use of, for example, fast Fourier transform (FFT). To better protect against side-channel attacks, better SCA-resistant techniques to boost MTD in the frequency-domain are highly useful.

BRIEF DESCRIPTION OF THE DRAWINGS

The invention may best be understood by referring to the following description and accompanying drawings that are used to illustrate embodiments of the invention. In the drawings:

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIG. 15 illustrates a block diagram contrasting the use of a software instruction converter to convert binary instructions in a source instruction set to binary instructions in a target instruction set according to embodiments of the invention.

DETAILED DESCRIPTION

Figure 1:
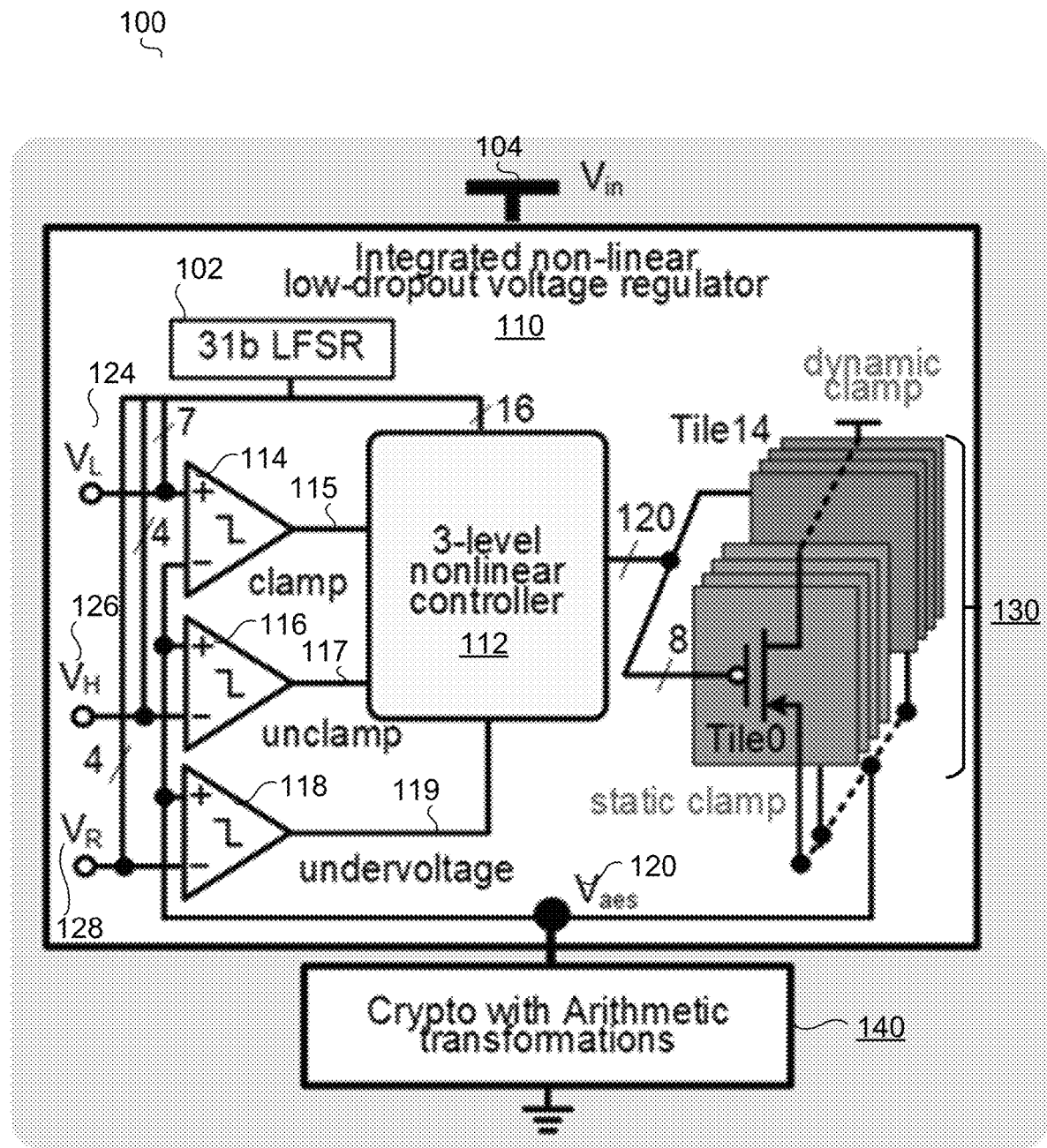
FIG. 1 is a block diagram illustrating a system on which various embodiments of the present invention may be implemented.

Embodiments of apparatus and method for increasing the resistance to side-channel attacks on cryptographic devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Cryptographic engines such as AES (Advanced Encryption Standard), RSA (Rivest-Shamir-Adleman), and ECC (elliptic-curve cryptography) are susceptible to physical side-channel attacks (SCAs), which are attacks based on information gained from the implementation of the computing device rather than weaknesses in the implemented algorithm itself (e.g. cryptanalysis or software bugs). Physical characteristics such as timing information, power consumption, electromagnetic emissions, or even sound associated with the computing device can provide extra clues that can be exploited to extract information about the embedded secret. To counter SCA, numerous side-channel suppression techniques have been developed with the goal of providing a significant boost in the minimum traces to disclose (MTD), or the minimum number of encryption traces required to disclose the first secret key byte. Conventional power regulator based SCA-resistant techniques can provide a considerable boost in time-domain MTD but tend to fall short in frequency-domain MTD. This is mainly because the induced transformations are often linear and thus can be exposed easily in the frequency spectrum, such by using fast Fourier transform (FFT). Better side-channel suppression techniques that can increase the MTD in frequency domain are thus needed.

Aspects of the present invention relate to a cascaded implementation of a non-linear low-dropout regulator (NL-LDO) and cryptographic engines augmented with arithmetic transformation to achieve more than five orders of magnitude in time and frequency domain MTD over unprotected crypto implementations. In one embodiment, an NL-LDO is implemented with multiple control parameters that can be randomized and tuned to bolster SCA resistance in the frequency-domain. The synergetic operation of the randomized control parameters and the arithmetic transformations in the crypto engines provides a significant boost in the time and frequency-domain MTD, achieving returns that exceed the sum of individual improvements. In some embodiments, the proposed cascaded implementation of NL-LDO with arithmetic transformations can provide improvements of more than 5 orders of magnitude ($>10^5\times$) in time- and frequency-domain MTD over unprotected crypto implementation. This is achieved while incurring less than 10% area overheads.

FIG. 1 is a block diagram illustrating a system on which various embodiments of the present invention may be implemented. System 100 includes an integrated non-linear low-dropout regulator (NL-LDO) 110 and a cryptographic block (crypto block) 140 with arithmetic transformations. According to an embodiment, the NL-LDO 110 is cascaded with crypto block 140 such that the crypto block 140 receives power from the NL-DLDO 110. While the crypto block may be described in the specifications as an AES cipher, it will be apparent to one of ordinary skill in the art that the embodiments disclosed herein are highly scalable and can be generalized to be used with many different types of hardware crypto blocks.

In some embodiments, the NL-LDO 110 may be physically integrated with the crypto block 140 to form a single block. This way, only the power input 104 is visible to the outside world. In other embodiments, the NL-LDO 110 may be physically coupled to the crypto block 140, in which case the NL-LDO's power input 104 and the crypto block's power input 120 may be visible to the world. As the crypto block 140 operates, its power consumption may vary depending on the workload. For example, depending on the input bit and the key, a crypto block is going to consume different amount of power and/or emit different amount of electromagnetic emanation. An attacker may monitor the voltage or current consumed by crypto block and/or its electromagnetic emissions to develop a power profile for deducing the embedded secret key. To prevent such attacks, the NL_LDO 110 creates a disconnect between the crypto block's activities and its power consumption by artificially masking the variation in voltage of the crypto block ($V_{acs}$) 120 through a non-linear transformation.

In one embodiment, the NL-LDO 110 includes a controller 112 to control a scalable multi-dimensional power train 130. For example, the power train may be a two-dimensional power train that includes multiple tunable-strength P-channel metal-oxide-semiconductor (PMOS) tiles. The number of tunable-strength PMOS tiles may vary depending on the load requirements of the crypto block 140. In operation, the NL-LDO 110 provides a wide-dynamic-range, high-bandwidth response to mask high-frequency transients while making available multiple configurable control parameters for optimizing SCA-resistance.

As illustrated in FIG. 1, the power train includes 15 PMOS tiles (0-14) 130. In other embodiments, the number of tiles may be more or less than 15 depending on the load. Each of the tiles, according to an embodiment, is configurable to operate in one of three modes: (i) static current source with tunable strength; (ii) dynamic current source with tunable strength to bolster power train during fast load transients; and (iii) variable combination of static and dynamic current source. When the activity at the cryptographic block 140 is low and the power consumption steady, a subset of tiles may be configured to operate in the first mode to provide steady current to the crypto block 140 and to maintain a steady $V_{aes}$ 120 to mask out the power consumption. In some embodiments, the strength provided by the tiles in the first mode may be up to 1.2 mA in 40 μA steps. When the activity at the crypto block 140 is rigorous, such that the power consumption switches rapidly between low and high, the tiles may be configured to operate in the second mode. In this mode, the power train utilizes dynamic clamping in which the tiles can turn on and off rapidly to provide quick transitions to match the consumption. When more variation is desired, the clamps may be configured to operate in the third mode where the tiles operate in both static and dynamic mode to provide a random, non-linear current on top of the crypto block's actual consumption.

According to an embodiment, an event-driven non-linear control loop is asynchronously triggered by 3 output comparators: low voltage ($V_L$) comparator 114, high voltage ($V_H$) comparator 116, and undervoltage ($V_R$) comparator 118. The comparators compare the voltage of the crypto block ($V_{aes}$) against one of the configurable voltage thresholds. The voltage of the crypto block may be the voltage of the power input to the crypto block, which fluctuates based on the current draw. For example, the voltage drops during high current draw and rises or stabilizes during low current draw.

When the voltage of the crypto block ($V_{aes}$) 120 is greater than or above the high voltage threshold 126 (i.e. $V_{aes}>V_H$), as determined by comparator 116, an unclamp signal 117 is outputted to the non-linear controller 112 to limit voltage overshoots by disabling all tiles 130. If the voltage of the AES block ($V_{aes}$) 120 is less than or below the low voltage threshold 124 (i.e. $V_{aes}<V_L$), a clamp signal 115 is outputted by comparator 114 to turn on all tiles 130 at a strength determined by a dynamic clamp strength setting. When severe voltage droops crossing the $V_R$ guardband 128 are detected (i.e. $V_{aes}<V_R$), the non-linear controller 112 triggers an undervoltage signal 119 to turn on all 15 tiles 130 at maximum strength.

Figure 2:
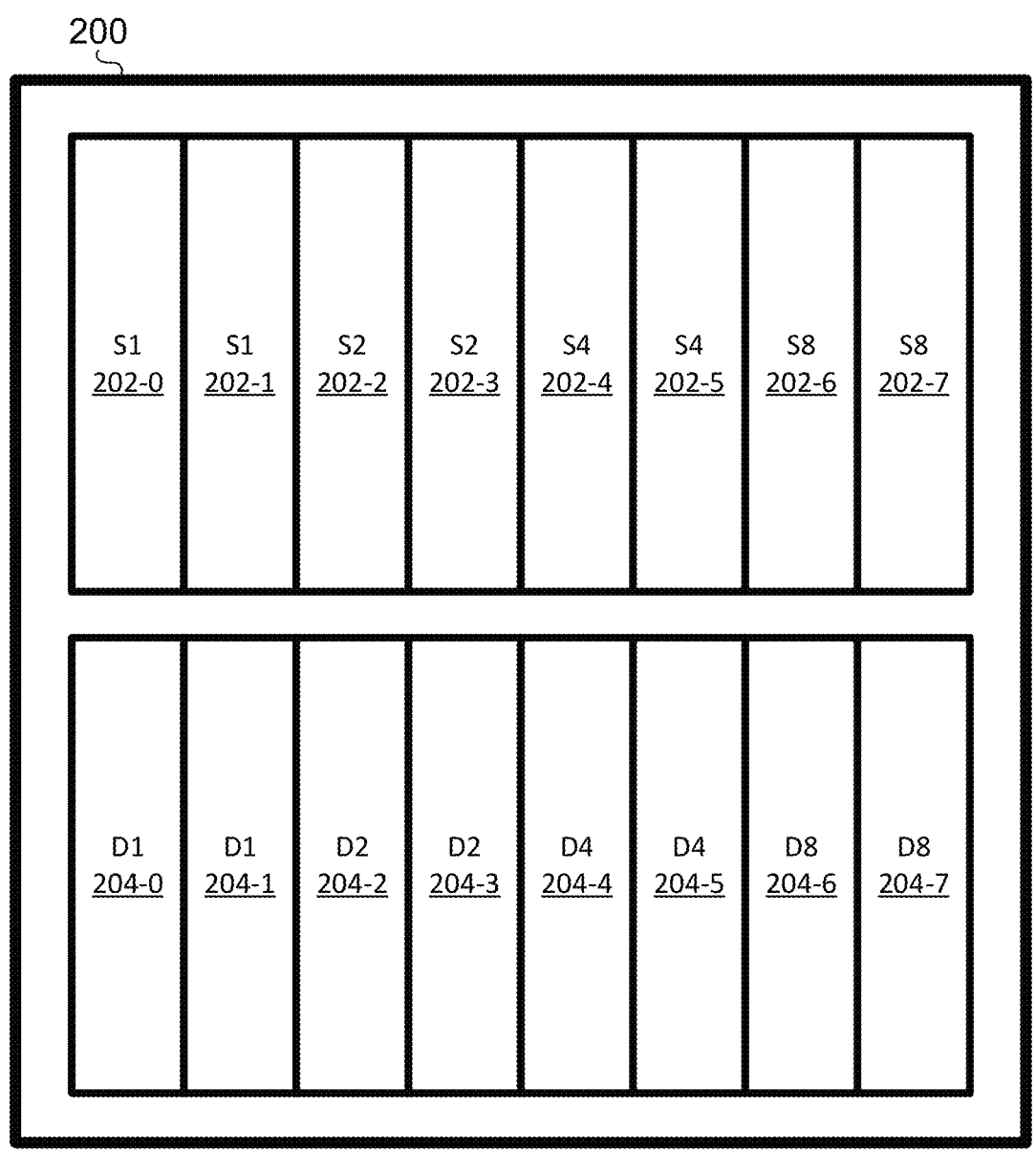
FIG. 2 is a block diagram illustrating an embodiment of a power train tile.

FIG. 2 illustrates a power train tile according to an embodiment. Tile 200 may be any one of the tiles in the power train 130 illustrated in FIG. 1. Tile 200 may include a set of static sub-tiles 202 and a set of dynamic sub-tiles 204. Each of the sub-tiles may be associated with a strength level. For example, according to an embodiment, static sub-tiles S1 (202-0 and 202-1) each have a strength level of 1, static sub-tiles S2 (202-2 and 202-3) each have a strength level of 2, static sub-tiles S4 (202-4 and 202-5) each have a strength level of 4, and static sub-tiles S8 (202-6 and 202-7) have a strength level of 8. By varying which tiles are turned on and off, tile 200 can provide a static power strength level between 0-30. The same applies to the dynamic tiles. According to an embodiment, dynamic sub-tiles D1 (204-0 and 204-1) each have a strength level of 1, dynamic sub-tiles D2 (204-2 and 204-3) each have a strength level of 2, dynamic sub-tiles D4 (204-4 and 204-5) each have a strength level of 4, and dynamic sub-tiles D8 (204-6 and 204-7) have a strength level of 8. Together, the dynamic sub-tiles 204 can provide tile 200 with a dynamic power strength level between 0-30. When tile 200 is operating in the first mode, as mentioned above, a subset of the static sub-tiles 202 may be turned to provide a current load at a strength level specified by a configurable static clamp strength parameter (e.g., static clamp strength). In the second mode, a subset of the dynamic sub-tiles 204 may be turned on to provide a current load strength level specified by a configurable dynamic strength parameter (e.g., dynamic clamp strength). In the third mode, subsets of static and dynamic sub-tiles may be turned on to provide a current load strength specified by their respective parameters.

Figure 3:
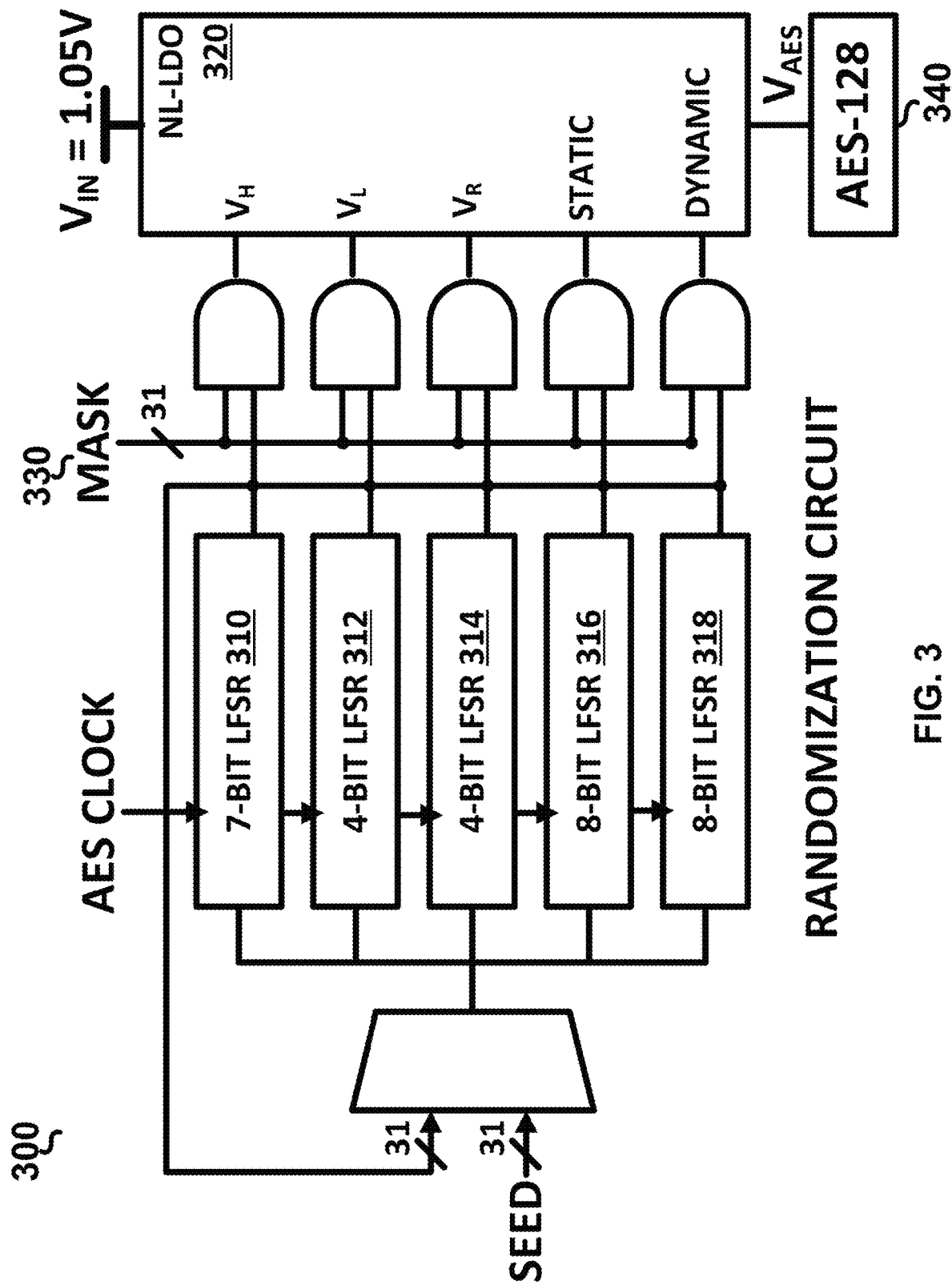
FIG. 3 is a block diagram illustrating an embodiment of a randomization circuit for randomizing control loop parameters.

To further harden the AES block against side-channel attacks, according to an embodiment, the control loop parameters are randomized to bolster frequency-domain SCA resistance. For example, control loop parameters such as the voltage thresholds $V_H$, $V_L$, and $V_R$, as well as the strength of the static and dynamic clamps may be randomized. FIG. 3 illustrates an embodiment of a randomization circuit for randomizing the control loop parameters. The randomization circuit 300 include a random bit generator to generate a random or pseudo-random sequence of bits to be used to determine and set the values of the control loop parameters. The random bit generator may include one or more on-chip linear-feedback shift register (LFSRs), such as the 31-bit LF SR 102 of FIG. 1. In FIG. 3, the random bit generator is comprised of 5 separate LFSRs 310-318. LFSR 310 is used to generate a randomized 7-bit sequence for setting the value of the high voltage threshold $V_H$. LFSRs 312 and 314 are each used to generate a randomized 4-bit sequence for setting the values of the low voltage and undervoltage thresholds, respectively. LFSRs 316 and 318 are each used to generate a randomized 8-bit sequence for setting the values of the static clamp strength and the dynamic clamp strength, respectively. These parameters are then inputted into the NL-LDO 320 for controlling the power train which, in turn, supplies the load current to regulate the voltage $V_{AES}$ of the crypto block 340. While the specific number of bits used for each control loop parameter are disclosed herein, it would be apparent to one of ordinary skill in the art that any number of bits may be used for any control parameters based on the implementation needs. For example, some implementation may have more, or less, control parameters than the ones disclosed herein. The control parameters may include ones that are different from $V_H$, $V_L$, $V_R$, and static/dynamic clamp strengths. Each of the control parameter may also be randomized based on bit sequences of different lengths than what is illustrated in FIG. 2. Different numbers or types of random bit generator may also be implemented in the randomization circuitry.

Figure 4:
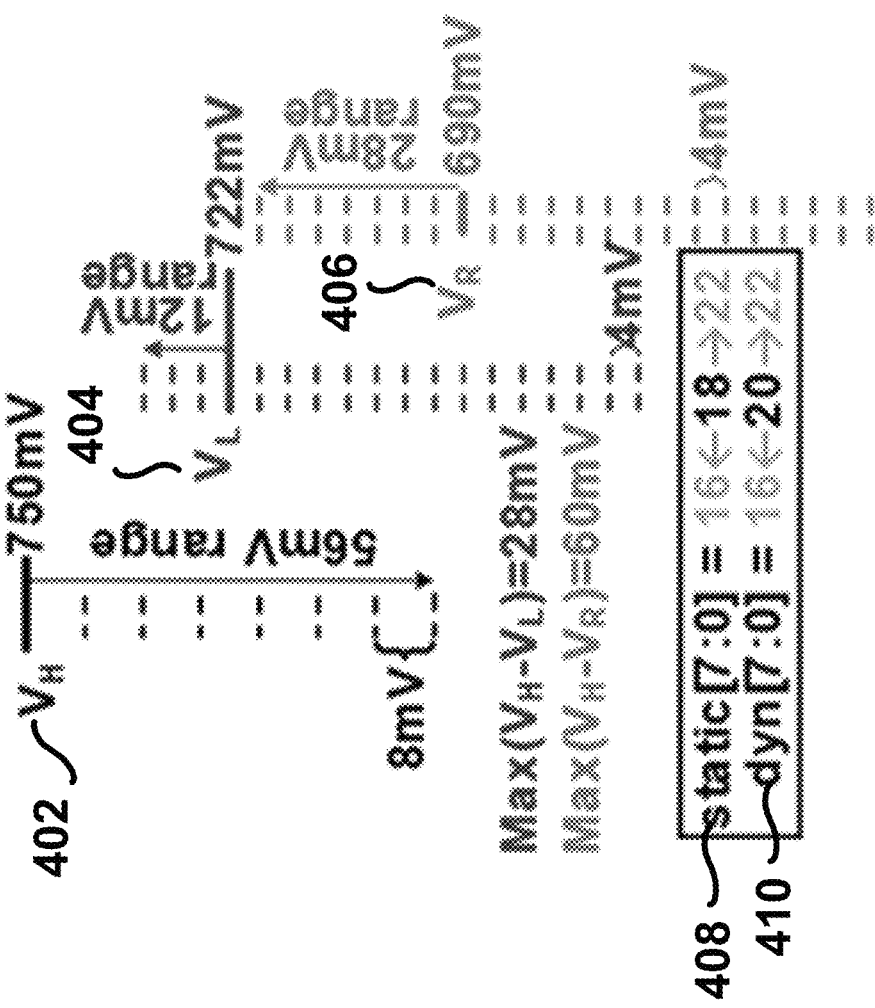
FIG. 4 illustrates the range of control loop parameter randomization according to an embodiment.

To ensure stable operation, a mask 330 is used in some embodiments to control the range in which the parameters may be randomized. For example, the mask may help to ensure that the high voltage threshold ($V_H$) is always set to a value greater than the low threshold ($V_L$) and the undervoltage threshold ($V_R$), while ensuring a minimum gap is present between the different voltage thresholds to prevent frequent clamping events. FIG. 4 illustrates the range of control loop parameter randomization according to an embodiment. In the illustrated example, it is assumed that the desired minimum gap between each voltage thresholds ($V_H$, $V_L$, $V_R$) is 16 mV and the desired maximum voltage difference between $V_H$ and $V_L$ and between $V_H$ and $V_R$ is 28 mV and 60 mV, respectively. According to an embodiment, $V_H$ 402 has a maximum value of 750 mV and a maximum range of 56 mV. The maximum value here may or may not be the maximum voltage achievable by the power train. In one embodiment, the value of $V_H$ is specified by a randomized bit sequence (e.g., a 7b bit sequence) generated by a random bit generator. The value of the bit sequence maps to a specific step or voltage value within the 56 mV range. For example, if every bit in the bit sequence is set, then $V_H$ 402 may be mapped to the highest step in the range or 750 mV. If no bits are set, then $V_H$ 402 may default to the lowest step or 694 mV (i.e. 750 mV-56 mV). A mask may be used to block off one or more bits in the bit sequence to provide a range limit for $V_H$. For example, if some of the most significant bits are masked off, then the possible range of values for $V_H$ may be reduced.

With respect to $V_L$ 404, it is specified by another bit sequence the value of which maps $V_L$ to a specific step or voltage value within a voltage range. In one embodiment, the bit sequence comprises 4 bits which represents 16 possible steps. Since there must be a minimum 16 mV and a maximum 28 mV gap between $V_H$ and $V_L$, the maximum possible value for $V_L$ is 734 mV (i.e. 750 mV-16 mV) and the minimum possible value is 666 mV (694 mV-28 mV). Thus, according to the embodiment, the possible range for $V_L$ is 734 mV to 666 mV divided into 16 steps. To ensure that the randomized $V_H$ value will always be higher than the randomized $V_L$ value by at least a 16 mV gap, a mask may be used to block off one or more bits in the bit sequence to reduce the upper bound for $V_L$'s range.

Similarly, $V_R$ 406 is also specified by a corresponding randomized bit sequence. In one embodiment, the bit sequence comprises 4 bits which represents 16 possible steps. Since there must be a minimum of 16 mV gap between $V_L$ and $V_R$ and a maximum 60 mV gap between $V_H$ and $V_R$, the maximum value for $V_R$ is 718 mV (i.e. 734 mV-16 mV) and the minimum value is 634 mV (694 mV-60 mV). To ensure that the randomized $V_L$ value 404 will always be higher than the randomized $V_R$ value 406 by at least a 16 mV gap, a mask may also be used here to block off one or more most significant bits of the 4-bit sequence to create an upper bound for $V_R$'s range.

With respect to static and dynamic strengths, they are each set by a corresponding randomized sequence. According to an embodiment, the static strength is determined by a randomized 8-bit sequence 408. Each of the 8 bits corresponds to a static strength/weight or a static sub-tile (e.g., 202) within a power tile. Similarly, the dynamic strength is determined by another randomized 8-bit sequence 410. Each of the 8 bits corresponds to a dynamic strength/weight or a dynamic sub-tile (e.g., 204). According to the embodiment, the static and dynamic strengths are determined by the sum of the strengths of the sub-tiles of the corresponding set bits in the bit sequence, or the sum of the corresponding strength/weights. For example, assume that some bits in a bit sequence for static strength are randomly set by the random bit generator. If the set bits correspond to static sub-tiles with strengths 1, 1, and 8 (e.g., sub-tiles 202-0, 202-1, and 202-6 of FIG. 2), then the static strength would be the sum of these sub-tile strengths (i.e. 10). The same applies for determining the dynamic strength. To narrow the possible range of the static and dynamic strengths, masks may be applied to their respective bit sequences to block off certain bits. While specific ranges and/or steps are disclosed herein with respect to FIG. 4, they are only used to illustrate the exemplary embodiment and are not in any way limiting. It will be apparent to one of ordinary skill in the art that the specified ranges and/or steps can be substituted with other numbers based on the implementation.

Figure 5:
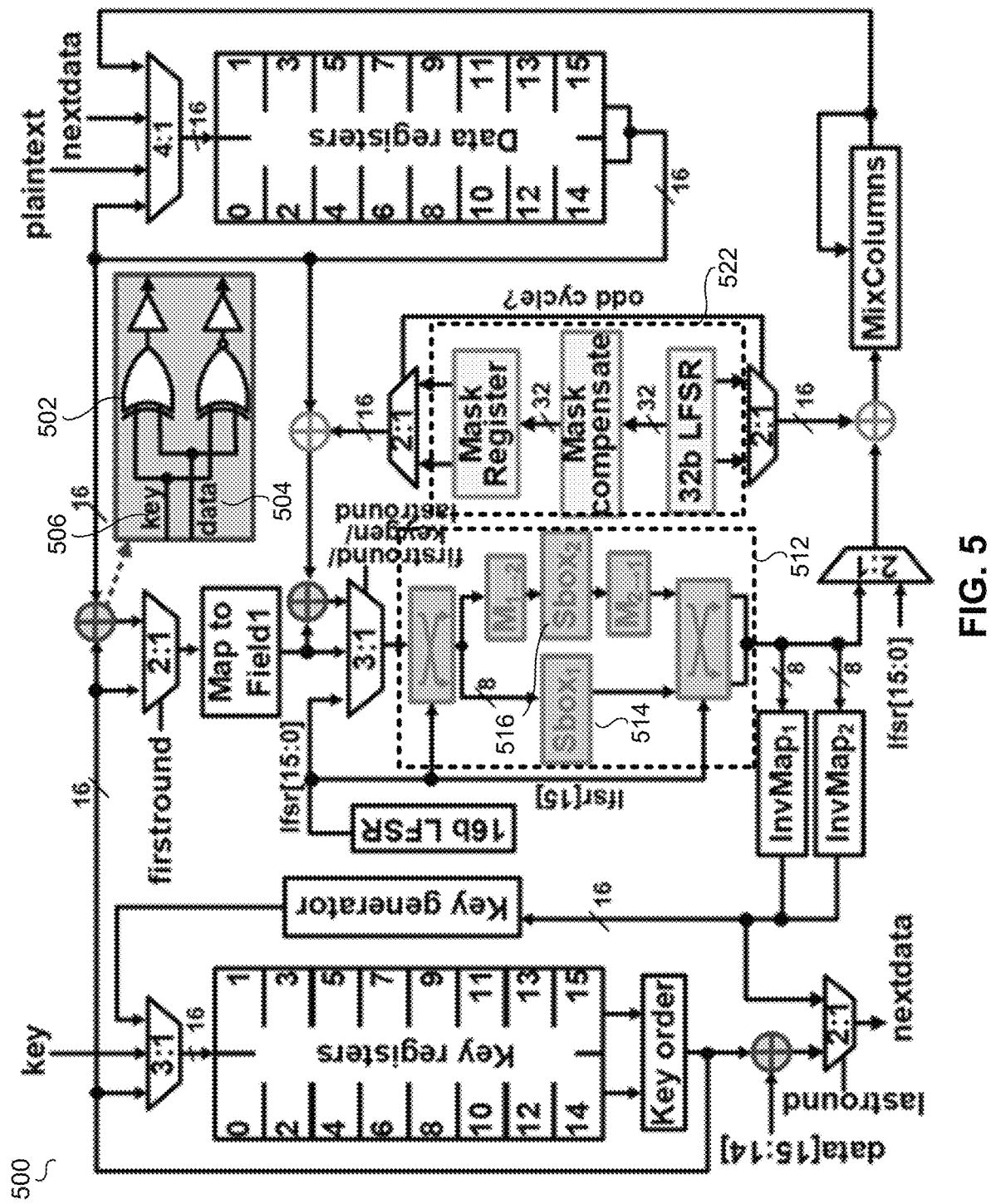
FIG. 5 is a diagram an embodiment of a cryptographic block with arithmetic transformations.

To further improve resistance against side-channel attacks in the frequency domain, the crypto block may be implemented with arithmetic transformations. FIG. 5 illustrates an embodiment of a cryptographic block with arithmetic transformations. In one embodiment, crypto block 500 is a serial 16 AES engine augmented with arithmetic transformation techniques. Crypto block 500 may include circuit 502 for performing transformation of data 504 with a key 506. In one embodiment, circuit 502 performs a bitwise exclusive or (XOR) between the data 504 and the key 506. The same is performed for the compliment. This may be referred to as a dual-rail key addition. The results from circuit 502 are then processed by circuit 512 for a non-linear transformation through substitute bytes or Sbox computations including random byte switching (i.e. to randomized data flow through heterogeneous Sboxes). For example, during a first run, a first byte of the result may be processed by Sbox1 514 while a second byte of the result is processes by Sbox2 516 and so on. This order is changed for a second run, thereby introducing a randomized byte-flow at runtime. The crypto block 500 further includes circuitry 522 for performing masking of the data known as linear-masked MixColumns. The AES engine with the associated arithmetic transformations is used here to illustrate a non-limiting example of a crypto block with arithmetic transformations. One of ordinary skill in the art will appreciate that other types of hardware crypto blocks, such as RSA and ECC, may be used instead to implement the same or similar arithmetic transformations, as well as different arithmetic transformations.

Figure 6A:
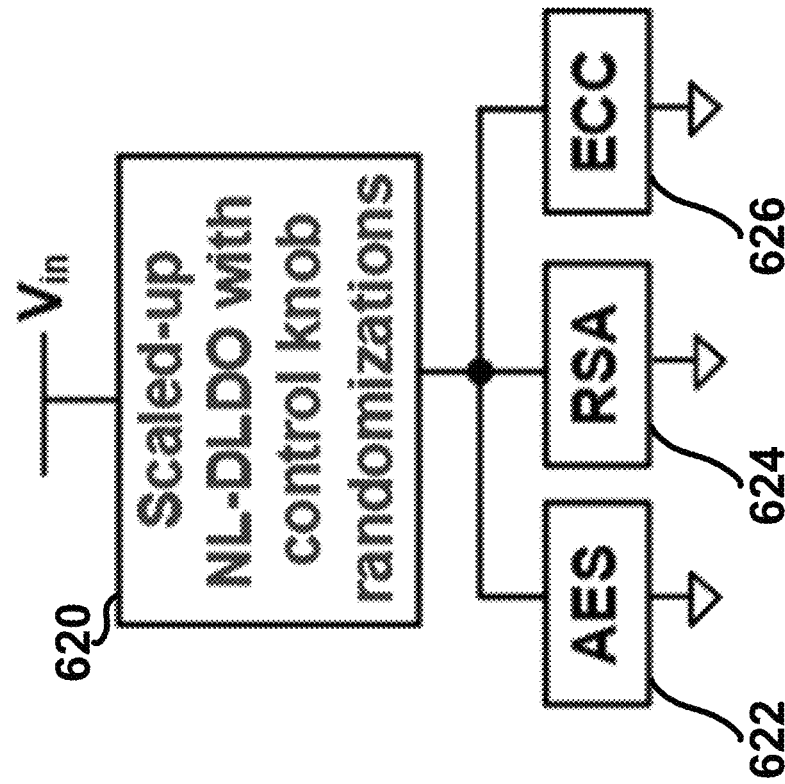
FIG. 6A illustrates a non-linear low-dropout regulator and cryptographic block combination according to an embodiment.
Figure 6B:
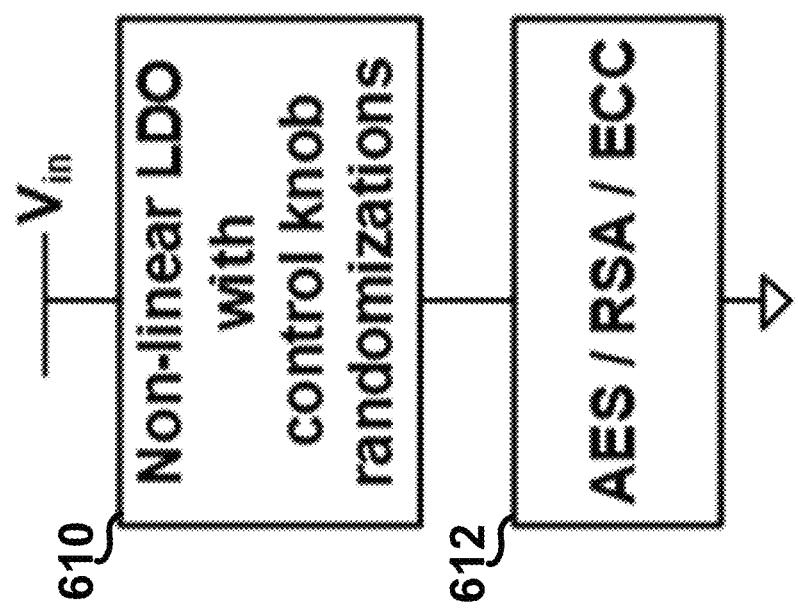
FIG. 6B illustrates a different non-linear low-dropout regulator and cryptographic block combination according to another embodiment.

FIGS. 6A and 6B illustrate exemplary embodiments of the NL-LDO and crypto block combination. In FIG. 6A, NL-LDO 610 is coupled with a single crypto block 612. In contrast, NL-LDO 620 of FIG. 6B is coupled to multiple crypto blocks (622, 624, and 626). NL-LDO 620 may be a scaled-up version of NL-LDO 610 in that NL-LDO 620 may include a stronger power train, such as one with more power tiles to concurrently provide enough power/current to the multiple crypto blocks. Crypto block 612, 622, 624, and 626 may employ any suitable cryptographic engine or algorithm such as AES, RSA, and ECC. Each of these crypto blocks may be augmented with arithmetic transformations.

Figure 7:
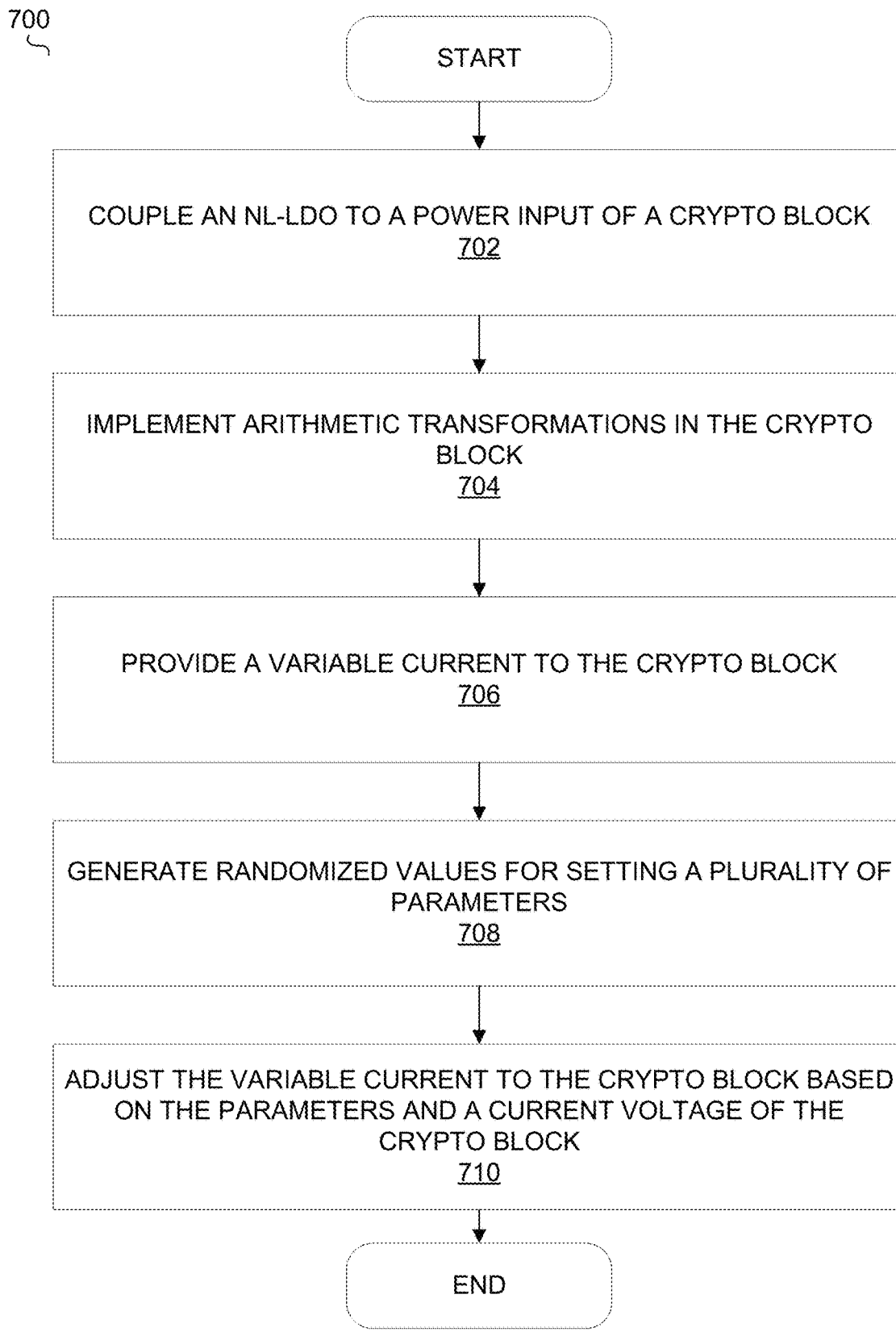
FIG. 7 is a flow diagram illustrating a method for countering side-channel attacks on a cryptographic block according to an embodiment.

FIG. 7 is a flow diagram illustrating a method for countering side-channel attacks on a crypto block according to an embodiment. Method 700 may be implemented by any of the system platforms described herein (e.g., system illustrated in FIG. 1). At 702, an NL-LDO is coupled to the power input of a crypto block. At 704, the crypto block is implemented or modified with arithmetic transformations. At 706, the NL-LDO provide variable power or current to the crypto block through the power input. At 708, the NL-LDO generates a set of randomized values for setting parameters used to control the variable power or current provided to the crypto block. At 710, the NL-LDO adjust the variable power or current provided to the crypto block based on the parameters and a current voltage of the crypto block.

Figure 8:
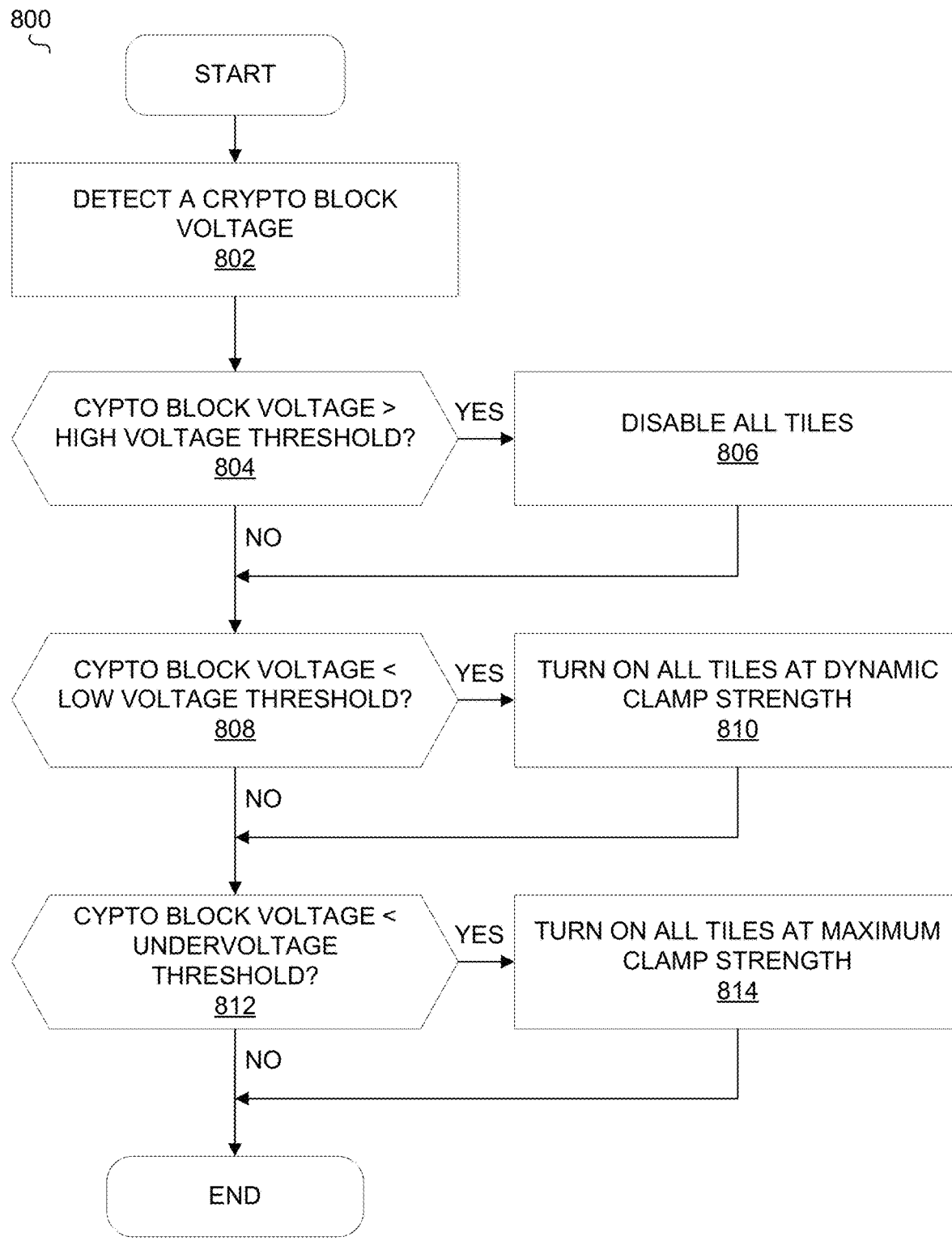
FIG. 8 is a flow diagram illustrating a method for adjusting the load current provided to a crypto block according to an embodiment.

FIG. 8 is a flow diagram illustrating a method for adjusting the load current provided to a crypto block according to an embodiment. Method 800 may be implemented by a NL-LDO (e.g., 110 of FIG. 1). At 802, a voltage of the crypto block is detected. A determination is made at 804 of whether the detected crypto block voltage is higher than a high voltage threshold. If so, then all power tiles are disabled at 806. If the crypto block voltage is not higher than the high voltage threshold, then at 808, the crypto block voltage is compared against a low voltage threshold. If the crypto block voltage is lower than the low voltage threshold, then at 810, all of the power tiles are turned on at a specified dynamic clamp strength. In one embodiment, this means turning on the dynamic sub-tiles in the power tiles. At 812, it is determined whether the crypto block voltage is lower than an undervoltage threshold. If so, at 814, all of the power tiles are turned on at maximum strength. Otherwise, the method ends.

EXAMPLES

The following are example implementations of different embodiments of the invention.

Example 1. An apparatus that includes a cryptographic block (crypto block) to perform cryptographic operations and a non-linear low-dropout voltage regulator (NL-LDO) coupled to the crypto block's power input. The crypto block consumes a variable amount of power based on the cryptographic operations being performed. The NL-LDO includes a scalable power train to provide a variable load current to the crypto block, randomization circuitry to generate randomized values for setting a plurality of parameters, and a controller to adjust the variable load current provided by the scalable power train to the crypto block based on the plurality of parameters and a current voltage of the crypto block at the power input. The plurality of parameters may include voltage thresholds and scalable power train strength levels. The voltage thresholds include a high voltage threshold, a low voltage threshold, and a undervoltage threshold. The controller is to cause a decrease in the variable load current provided to the crypto block when the current voltage of the crypto block is above the high voltage threshold, an increase in the variable load current provided to the crypto block when the current voltage of the crypto block is below the low voltage threshold; and a maximization of the variable load current provided to the crypto block when the current voltage of the crypto block is below the undervoltage threshold.

Example 2. The apparatus of Example 1, wherein the scalable power train includes a plurality of power tiles, each power tile capable of providing load current at one of the power strength levels set by randomized values generated by the randomization circuitry.

Example 3. The apparatus of Example 2, wherein the controller is to turn on or off different power tiles to adjust the variable load current provided to the crypto block.

Example 4. The apparatus of Example 1, wherein the randomization circuitry is to generate a randomized bit sequence divided into a plurality of different portions, each portion used to set a value for one of the voltage thresholds or one of the power strength levels of the power train.

Example 5. The apparatus of Example 4, wherein a mask is applied to the randomized bit sequence to limit a range of the randomized values for setting the plurality of parameters.

Example 6. The apparatus of Example 5, wherein based on the mask, the high voltage threshold is always set to a value greater than the low voltage threshold and the undervoltage threshold.

Example 7. The apparatus of Example 5, wherein based on the mask, the low voltage threshold is always set to a value greater than the undervoltage threshold.

Example 8. The apparatus of Example 4, wherein the randomization circuitry includes a linear-feedback shift register (LFSR) to generate the randomized bit sequence.

Example 9. The apparatus of Example 1, wherein the NL-LDO is to provide a non-linear transformation of the variable amount of power consumed by the crypto block.

Example 10. The apparatus of Example 1, wherein the crypto block includes one of an AES crypto block, an RSA crypto block, or an ECC crypto block.

Example 11. The apparatus of Example 1, wherein the NL-LDO is to concurrently provide a second variable load current to a second crypto block.

Example 12. The apparatus of Example 1, wherein the crypto block includes an AES crypto block including arithmetic transformations that includes randomized data flow through heterogeneous Sboxes, dual-rail key addition, and linear-masked MixColumns.

Example 13. A method that includes: coupling a non-linear low-dropout voltage regulator (NL-LDO) to a power input of a cryptographic block (crypto block), the crypto block to consume a variable amount of power based on different cryptographic operations performed by the crypto block; providing, by the NL-LDO, a variable load current to the crypto block; generating randomized values for setting a plurality of parameters including voltage thresholds and power strength levels, the voltage thresholds comprising a high voltage threshold, a low voltage threshold, and a undervoltage threshold; and adjusting the variable load current provided to the crypto block based on the plurality of parameters and a current voltage of the crypto block at the power input, wherein adjusting the variable load current further includes: decreasing the variable load current provided to the crypto block when the current voltage of the crypto block is above the high voltage threshold; increasing the variable load current provided to the crypto block when the current voltage of crypto block is below the low voltage threshold; and maximizing the variable load current provided to the crypto block when the current voltage of the crypto block is below the undervoltage threshold.

Example 14. The method of Example 13, further includes providing load current at one of the power strength levels set by the randomized values.

Example 15. The method of Example 14, further includes turning on or off different power tiles of the NL-LDO to adjust the variable load current provided to the crypto block.

Example 16. The method of Example 13, wherein generating randomized values for setting the plurality of parameters further includes: generating a randomized bit sequence; dividing the randomized bit sequence into a plurality of different portions; and using each portion to set a value for one of the voltage thresholds or one of the power strength levels.

Example 17. The method of Example 16, further includes applying a mask to the randomized bit sequence to limit a range of the randomized values for setting the plurality of parameters.

Example 18. The method of Example 17, further includes setting the high voltage threshold to a value greater than the low voltage threshold and the undervoltage threshold based on the mask.

Example 19. The method of Example 17, further includes setting the low voltage threshold to a value greater than the undervoltage threshold based on the mask.

Example 20. The method of Example 16, further includes generating the randomized bit sequence using a linear-feedback shift register (LFSR).

Example 21. The method of Example 13, further includes providing, by the NL-LDO, a non-linear transformation of the variable amount of power consumed by the crypto block.

Example 22. The method of Example 13, wherein the crypto block includes one of an AES crypto block, an RSA crypto block, or an ECC crypto block.

Example 23. The method of Example 13, further includes concurrently providing, by the NL-LDO, a second variable load current to a second crypto block.

Example 24. The method of Example 13, wherein the crypto block includes an AES crypto block including arithmetic transformations that includes randomized data flow through heterogeneous Sboxes, dual-rail key addition, and linear-masked MixColumns Exemplary Processor Architectures and Data Types FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end hardware 930 coupled to an execution engine hardware 950, and both are coupled to a memory hardware 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end hardware 930 includes a branch prediction hardware 932 coupled to an instruction cache hardware 934, which is coupled to an instruction translation lookaside buffer (TLB) 936, which is coupled to an instruction fetch hardware 938, which is coupled to a decode hardware 940. The decode hardware 940 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode hardware 940 or otherwise within the front end hardware 930). The decode hardware 940 is coupled to a rename/allocator hardware 952 in the execution engine hardware 950.

The execution engine hardware 950 includes the rename/allocator hardware 952 coupled to a retirement hardware 954 and a set of one or more scheduler hardware 956. The scheduler hardware 956 represents any number of different schedulers, including reservations stations, central instruction window, etc. The scheduler hardware 956 is coupled to the physical register file(s) hardware 958. Each of the physical register file(s) hardware 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 958 comprises a vector registers hardware, a write mask registers hardware, and a scalar registers hardware. This register hardware may provide architectural vector registers, vector mask registers, and general purpose registers. The physical register file(s) hardware 958 is overlapped by the retirement hardware 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 954 and the physical register file(s) hardware 958 are coupled to the execution cluster(s) 960. The execution cluster(s) 960 includes a set of one or more execution hardware 962 and a set of one or more memory access hardware 964. The execution hardware 962 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 956, physical register file(s) hardware 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 964). It should also be understood that where separate pipelines are used, one or more of these pipelines may be out-of-order issue/execution and the rest in-order.

The set of memory access hardware 964 is coupled to the memory hardware 970, which includes a data TLB hardware 972 coupled to a data cache hardware 974 coupled to a level 2 (L2) cache hardware 976. In one exemplary embodiment, the memory access hardware 964 may include a load hardware, a store address hardware, and a store data hardware, each of which is coupled to the data TLB hardware 972 in the memory hardware 970. The instruction cache hardware 934 is further coupled to a level 2 (L2) cache hardware 976 in the memory hardware 970. The L2 cache hardware 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode hardware 940 performs the decode stage 906; 3) the rename/allocator hardware 952 performs the allocation stage 908 and renaming stage 910; 4) the scheduler hardware 956 performs the schedule stage 912; 5) the physical register file(s) hardware 958 and the memory hardware 970 perform the register read/memory read stage 914; the execution cluster 960 perform the execute stage 916; 6) the memory hardware 970 and the physical register file(s) hardware 958 perform the write back/memory write stage 918; 7) various hardware may be involved in the exception handling stage 922; and 8) the retirement hardware 954 and the physical register file(s) hardware 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 934/974 and a shared L2 cache hardware 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
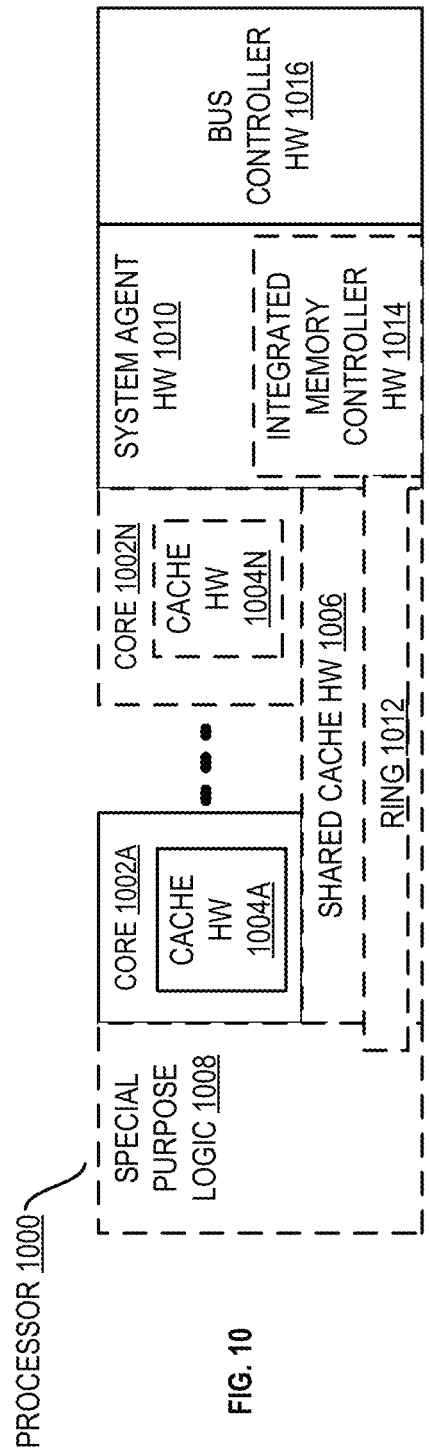
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller hardware 1016, while the optional addition of the dashed lined boxes illustrates an alternative processor 1000 with multiple cores 1002A-N, a set of one or more integrated memory controller hardware 1014 in the system agent hardware 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1006, and external memory (not shown) coupled to the set of integrated memory controller hardware 1014. The set of shared cache hardware 1006 may include one or more mid-level caches, such as level 2 (L2), level 3 (L3), level 4 (L4), or other levels of cache, a last level cache (LLC), and/or combinations thereof. While in one embodiment a ring based interconnect hardware 1012 interconnects the integrated graphics logic 1008, the set of shared cache hardware 1006, and the system agent hardware 1010/integrated memory controller hardware 1014, alternative embodiments may use any number of well-known techniques for interconnecting such hardware. In one embodiment, coherency is maintained between one or more cache hardware 1006 and cores 1002-A-N.

In some embodiments, one or more of the cores 1002A-N are capable of multi-threading. The system agent 1010 includes those components coordinating and operating cores 1002A-N. The system agent hardware 1010 may include for example a power control unit (PCU) and a display hardware. The PCU may be or include logic and components needed for regulating the power state of the cores 1002A-N and the integrated graphics logic 1008. The display hardware is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. In one embodiment, the cores 1002A-N are heterogeneous and include both the "small" cores and "big" cores described below.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
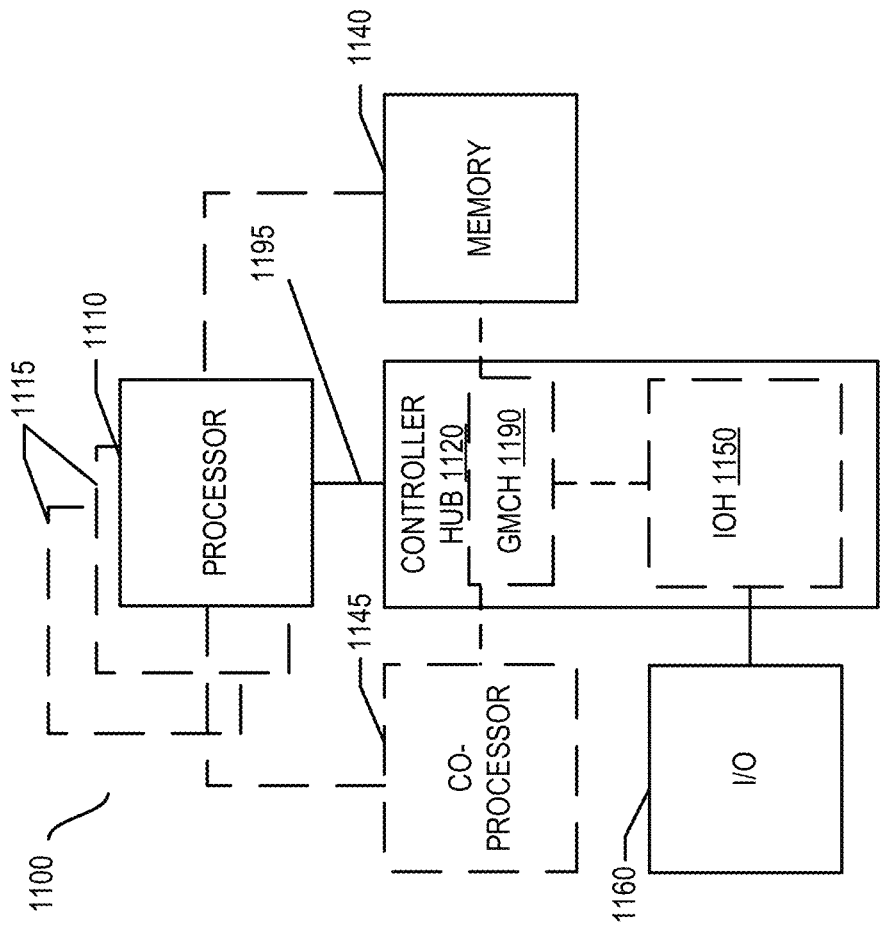
FIG. 11 illustrates a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
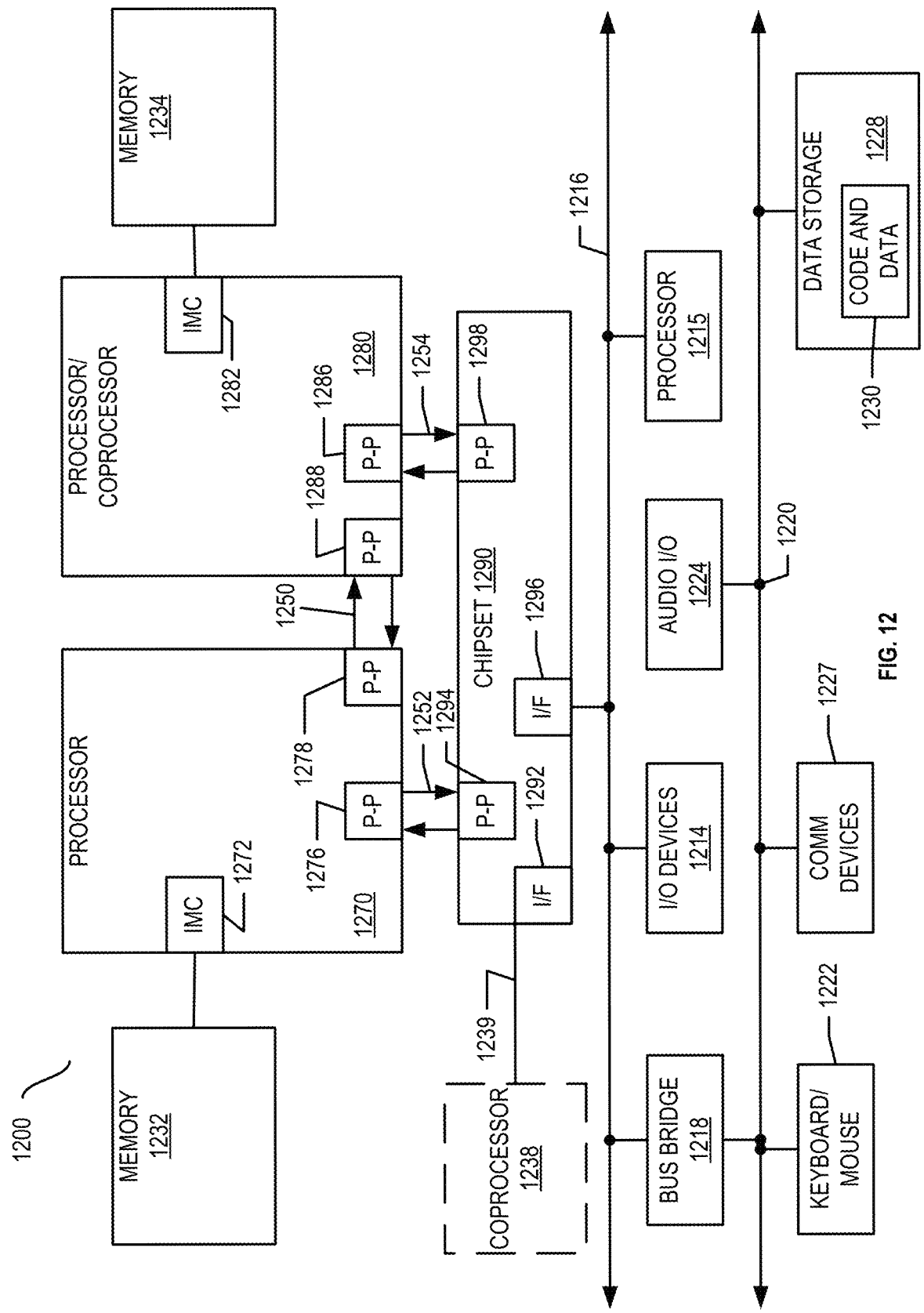
FIG. 12 illustrates a block diagram of a second system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) hardware 1272 and 1282, respectively. Processor 1270 also includes as part of its bus controller hardware point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) hardware), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage hardware 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
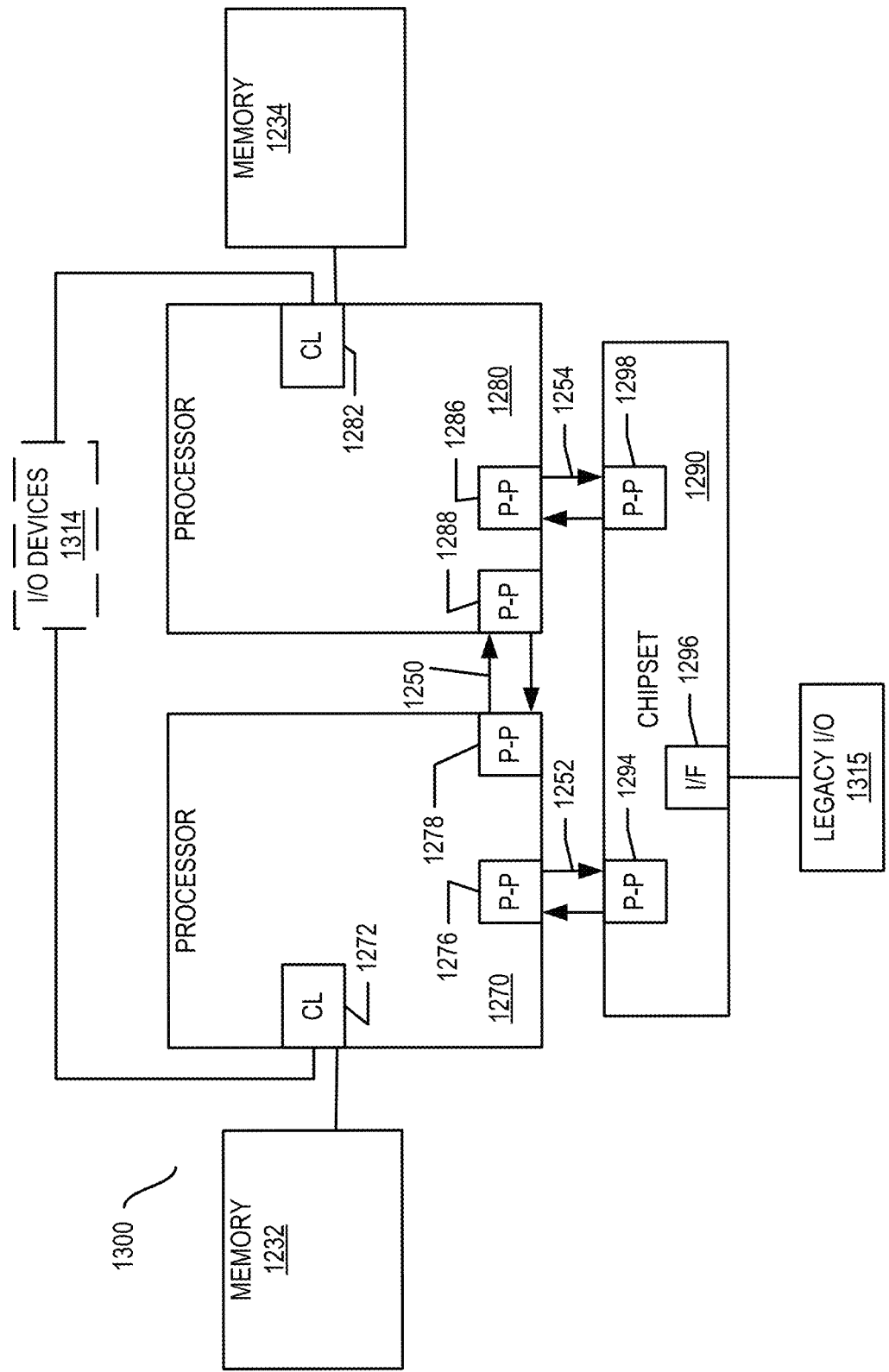
FIG. 13 illustrates a block diagram of a third system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller hardware and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
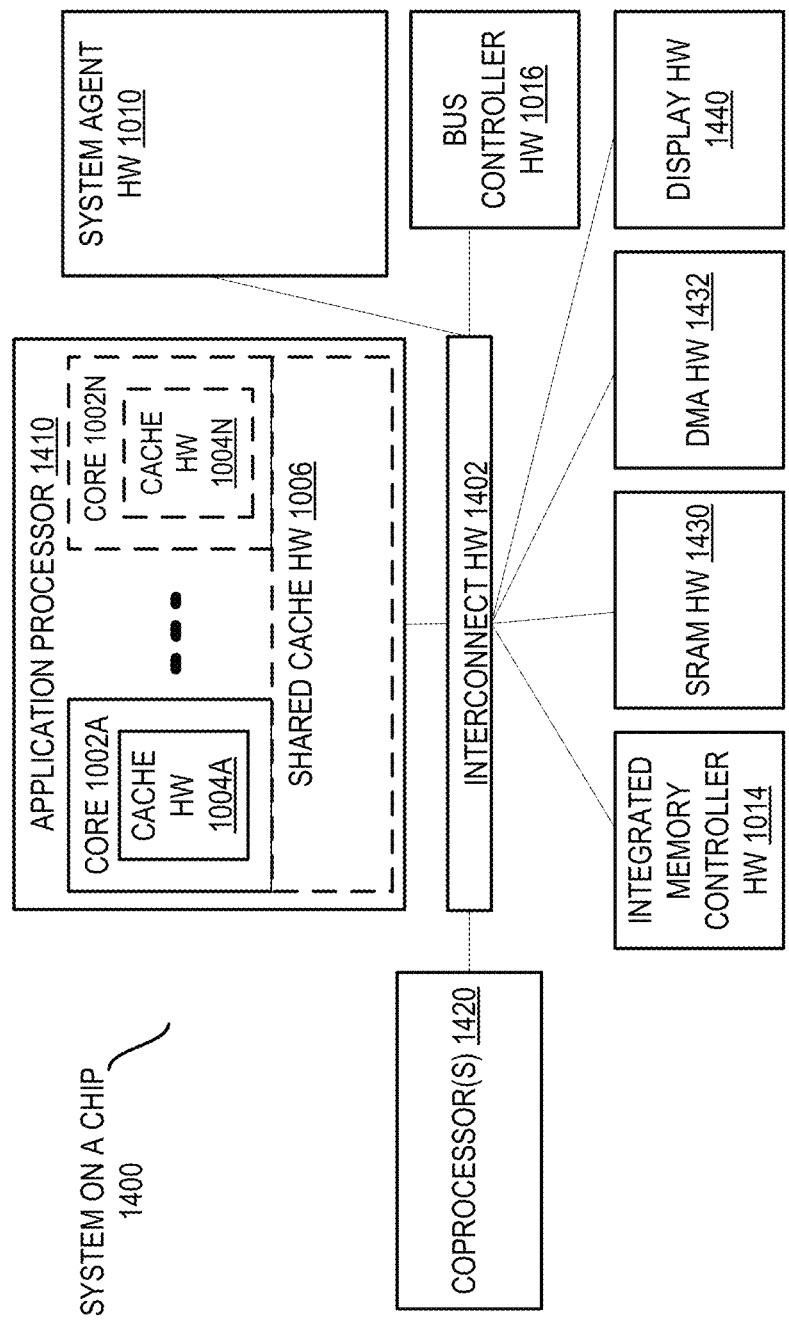
FIG. 14 illustrates a block diagram of a system on a chip (SoC) in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect hardware 1402 is coupled to: an application processor 1410 which includes a set of one or more cores 1002A-N and shared cache hardware 1006; a system agent hardware 1010; a bus controller hardware 1016; an integrated memory controller hardware 1014; a set or one or more coprocessors 1420 which may include integrated graphics logic, an image processor, an audio processor, and a video processor; an static random access memory (SRAM) hardware 1430; a direct memory access (DMA) hardware 1432; and a display hardware 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, CA and/or that execute the ARM instruction set of ARM Holdings of Sunnyvale, CA). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:
1. An apparatus comprising:
 a cryptographic block (crypto block) to perform cryptographic operations, the crypto block to consume a variable amount of power based on the cryptographic operations performed by the crypto block; and a non-linear low-dropout voltage regulator (NL-LDO) coupled to a power input of the crypto block, the NL-LDO to provide a non-linear transformation of the variable amount of power consumed by the crypto block, the NL-LDO comprising:
  a scalable power train to provide a variable load current to the crypto block;
  randomization circuitry to generate randomized values for setting a plurality of parameters including voltage thresholds and scalable power train strength levels, the voltage thresholds comprising a high voltage threshold, a low voltage threshold, and a undervoltage threshold; and
  a controller to adjust the variable load current provided by the scalable power train to the crypto block based on the plurality of parameters and a current voltage of the crypto block at the power input;
  wherein the controller is to cause:
    a decrease in the variable load current provided to the crypto block when the current voltage of the crypto block is above the high voltage threshold;
    an increase in the variable load current provided to the crypto block when the current voltage of the crypto block is below the low voltage threshold; and
    a maximization of the variable load current provided to the crypto block when the current voltage of the crypto block is below the undervoltage threshold.

2. The apparatus of claim 1, wherein the scalable power train comprises a plurality of power tiles, each power tile capable of providing load current at one of the power strength levels set by randomized values generated by the randomization circuitry.

3. The apparatus of claim 2, wherein the controller is to turn on or off different power tiles to adjust the variable load current provided to the crypto block.

4. The apparatus of claim 1, wherein the randomization circuitry is to generate a randomized bit sequence divided into a plurality of different portions, each portion used to set a value for one of the voltage thresholds or one of the power strength levels of the power train.

5. The apparatus of claim 4, wherein a mask is applied to the randomized bit sequence to limit a range of the randomized values for setting the plurality of parameters.

6. The apparatus of claim 5, wherein based on the mask, the high voltage threshold is always set to a value greater than the low voltage threshold and the undervoltage threshold.

7. The apparatus of claim 5, wherein based on the mask, the low voltage threshold is always set to a value greater than the undervoltage threshold.

8. The apparatus of claim 4, wherein the randomization circuitry comprises a linear-feedback shift register (LFSR) to generate the randomized bit sequence.

9. The apparatus of claim 1, wherein the crypto block comprises one of an AES crypto block, an RSA crypto block, or an ECC crypto block.

10. The apparatus of claim 1, wherein the NL-LDO is to concurrently provide a second variable load current to a second crypto block.

11. The apparatus of claim 1, wherein the crypto block is implemented with arithmetic transformations.

12. The apparatus of claim 11, wherein the crypto block comprises an AES crypto block and the arithmetic transformations comprise randomized data flow through heterogeneous Sboxes, dual-rail key addition, and linear-masked MixColumns.

13. A method comprising:
  coupling a non-linear low-dropout voltage regulator (NL-LDO) to a power input of a cryptographic block (crypto block), the crypto block to consume a variable amount of power based on different cryptographic operations performed by the crypto block;
  providing, by the NL-LDO, a variable load current to the crypto block and a non-linear transformation of the variable amount of power consumed by the crypto block;
  generating randomized values for setting a plurality of parameters including voltage thresholds and power strength levels, the voltage thresholds comprising a high voltage threshold, a low voltage threshold, and a undervoltage threshold;
  adjusting the variable load current provided to the crypto block based on the plurality of parameters and a current voltage of the crypto block at the power input, wherein the adjusting comprises:
    decreasing the variable load current provided to the crypto block when the current voltage of the crypto block is above the high voltage threshold;
    increasing the variable load current provided to the crypto block when the current voltage of crypto block is below the low voltage threshold; and
    maximizing the variable load current provided to the crypto block when the current voltage of the crypto block is below the undervoltage threshold.

14. The method of claim 13, further comprises providing load current at one of the power strength levels set by the randomized values.

15. The method of claim 14, further comprises turning on or off different power tiles of the NL-LDO to adjust the variable load current provided to the crypto block.

16. The method of claim 13, wherein generating randomized values for setting the plurality of parameters further comprises:
  generating a randomized bit sequence;
  dividing the randomized bit sequence into a plurality of different portions; and
  using each portion to set a value for one of the voltage thresholds or one of the power strength levels.

17. The method of claim 16, further comprises applying a mask to the randomized bit sequence to limit a range of the randomized values for setting the plurality of parameters.

18. The method of claim 17, further comprises setting the high voltage threshold to a value greater than the low voltage threshold and the undervoltage threshold based on the mask.

19. The method of claim 17, further comprises setting the low voltage threshold to a value greater than the undervoltage threshold based on the mask.

20. The method of claim 16, further comprises generating the randomized bit sequence using a linear-feedback shift register (LFSR).

21. The method of claim 13, wherein the crypto block comprises one of an AES crypto block, an RSA crypto block, or an ECC crypto block.

22. The method of claim 13, further comprises concurrently providing, by the NL-LDO, a second variable load current to a second crypto block.

23. The method of claim 13, wherein the crypto block comprises an AES crypto block including arithmetic transformations that includes randomized data flow through heterogeneous Sboxes, dual-rail key addition, and linear-masked MixColumns.

* * * * *